(No Model.) 6 Sheets—Sheet 1.
R. G. WARD.
MACHINE FOR SCRAPING THE PULP, &c., FROM FIBROUS PLANTS.
No. 428,325. Patented May 20, 1890.
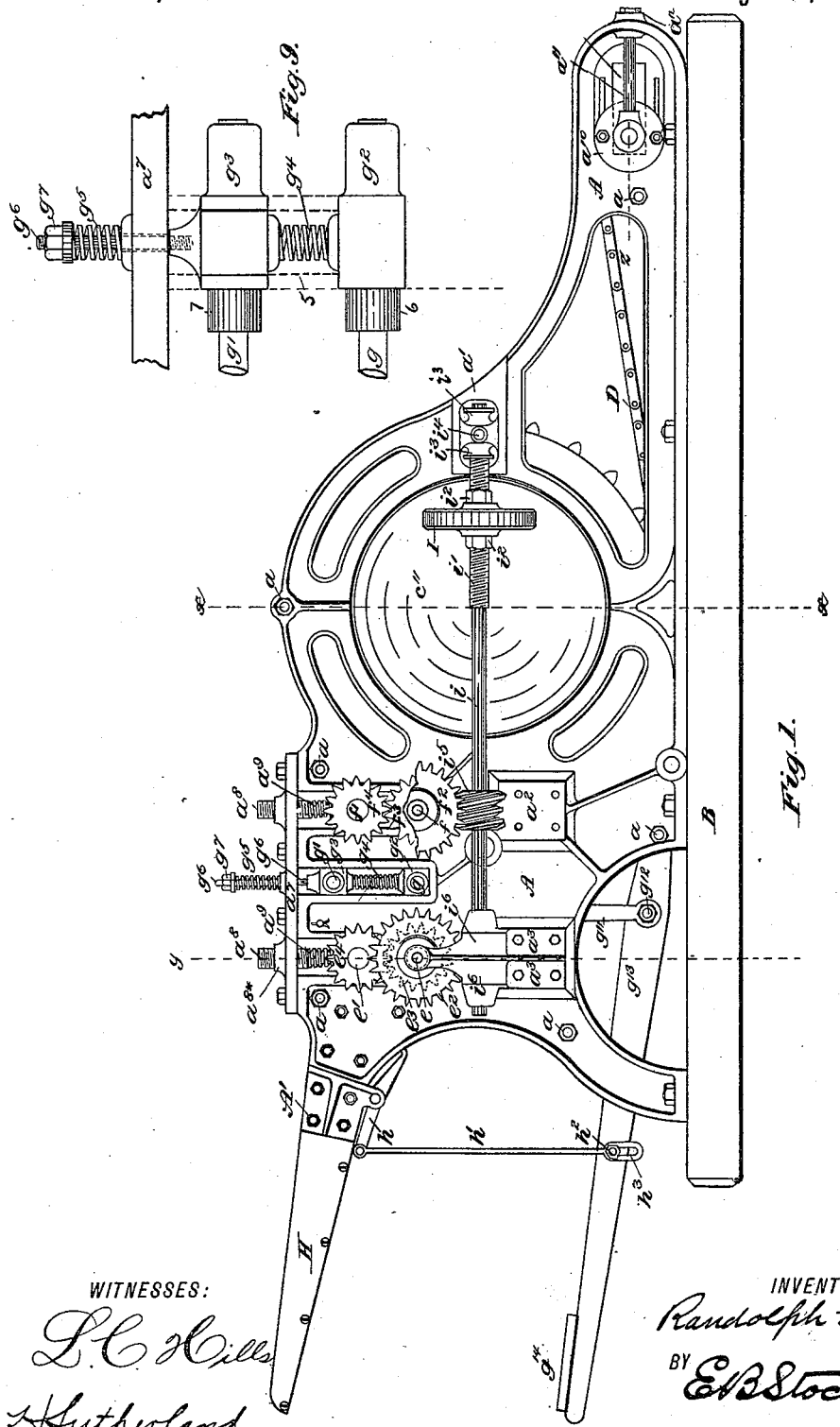
WITNESSES:
L. C. Hills
H. Sutherland
INVENTOR
Randolph G. Ward
BY E. B. Stocking
ATTORNEY (No Model.)  6 Sheets—Sheet 2.
R. G. WARD.
MACHINE FOR SCRAPING THE PULP, &c., FROM FIBROUS PLANTS.
No. 428,325. Patented May 20, 1890.
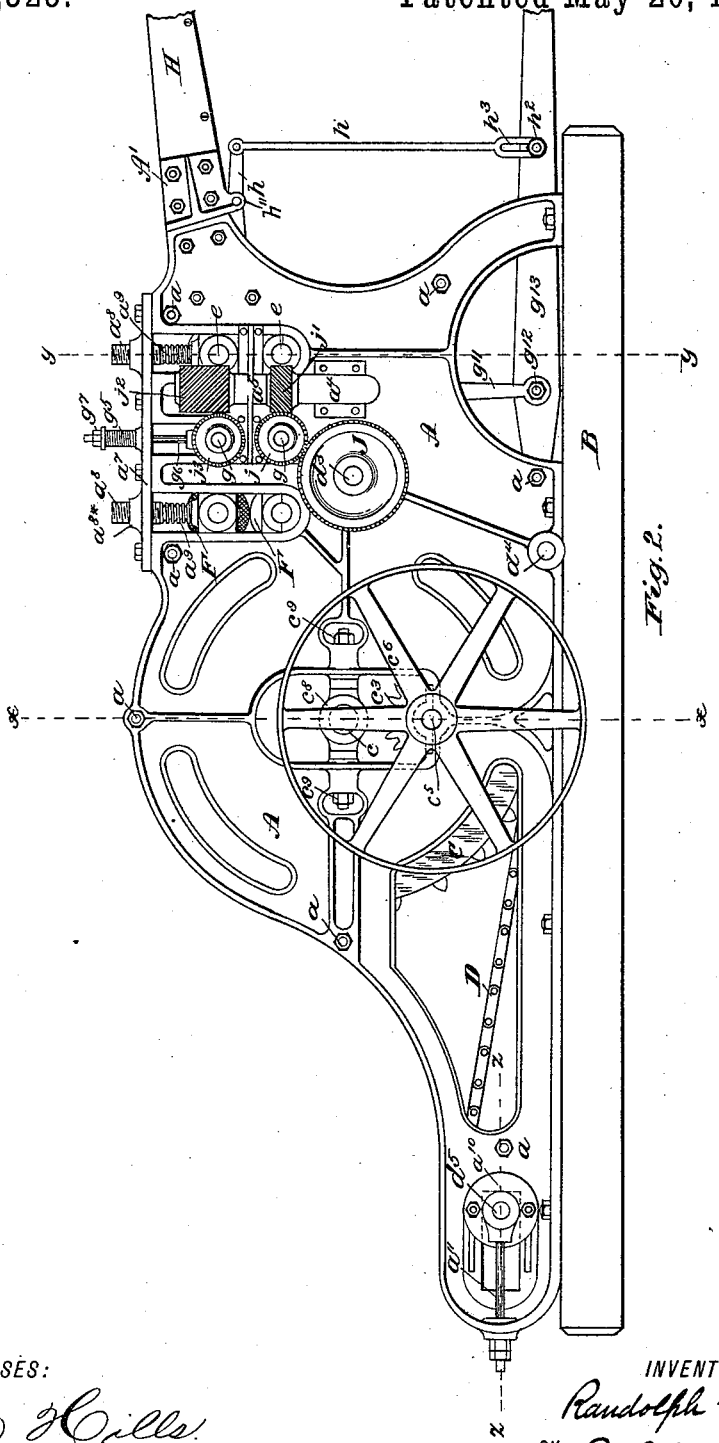
WITNESSES:
INVENTOR
Randolph G. Ward
BY E. B. Stocking
ATTORNEY

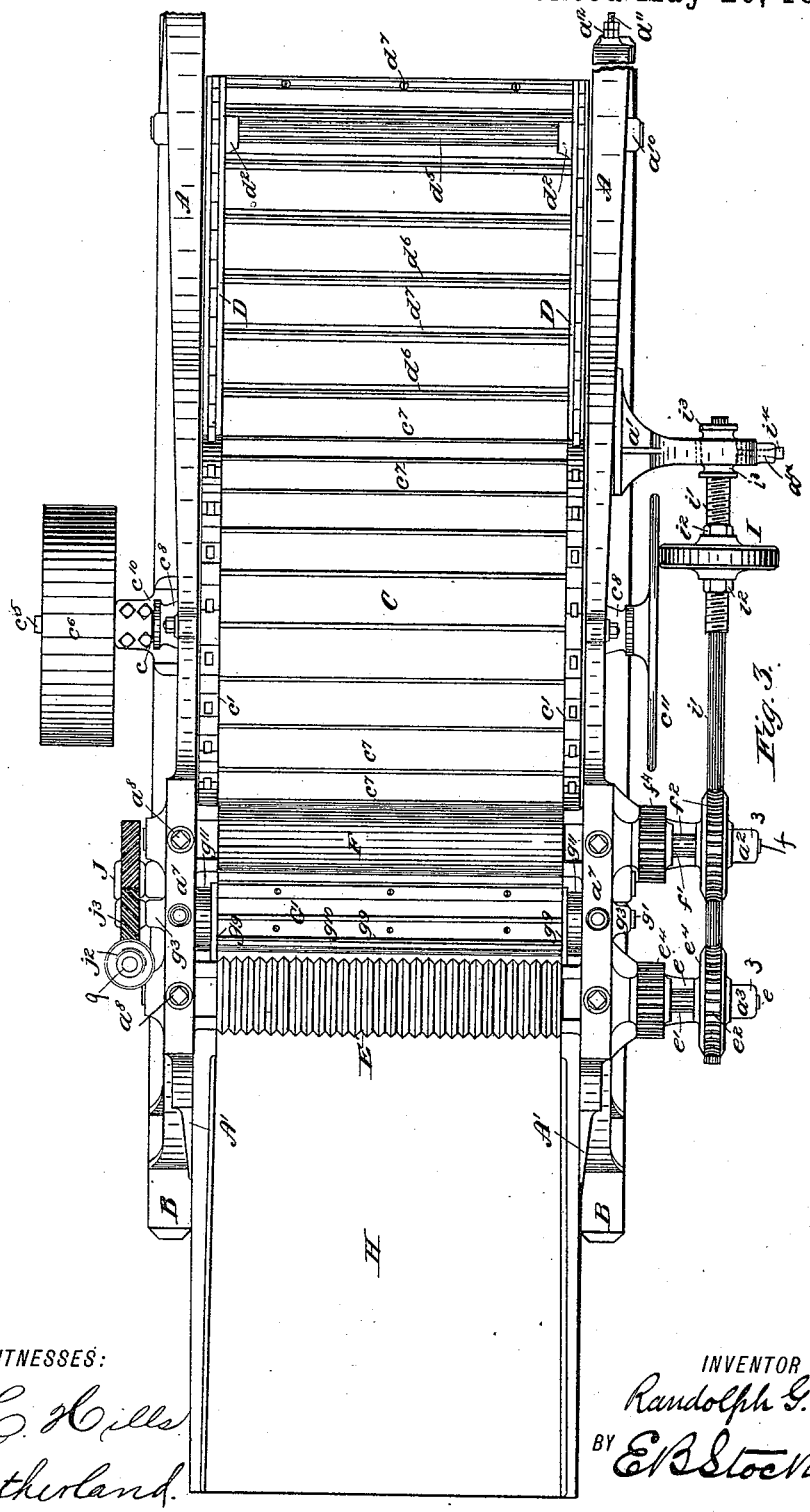

(No Model.) 6 Sheets—Sheet 4.
R. G. WARD.
MACHINE FOR SCRAPING THE PULP, &c., FROM FIBROUS PLANTS.
No. 428,325. Patented May 20, 1890.
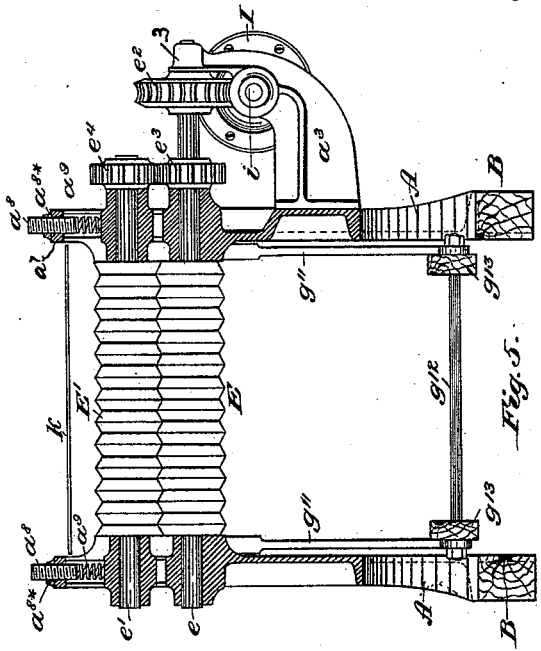
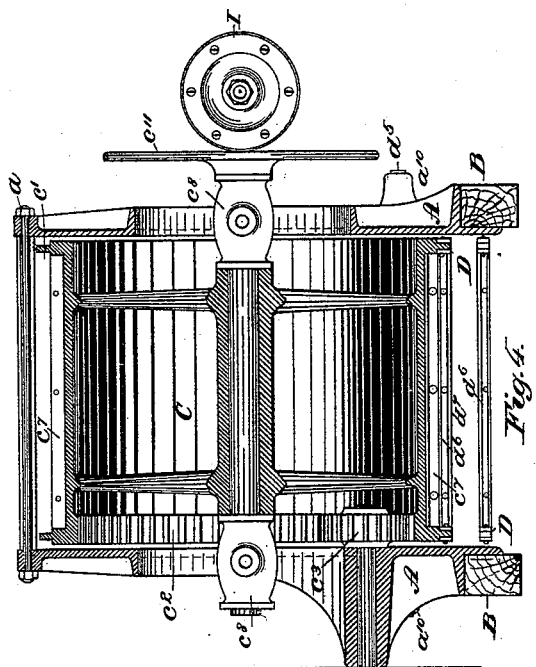
WITNESSES:
L. C. Hills
H. Sutherland
INVENTOR
Randolph G. Ward
BY E. B. Stocking
ATTORNEY (No Model.) 6 Sheets—Sheet 5.
R. G. WARD.
MACHINE FOR SCRAPING THE PULP, &c., FROM FIBROUS PLANTS.
No. 428,325. Patented May 20, 1890.
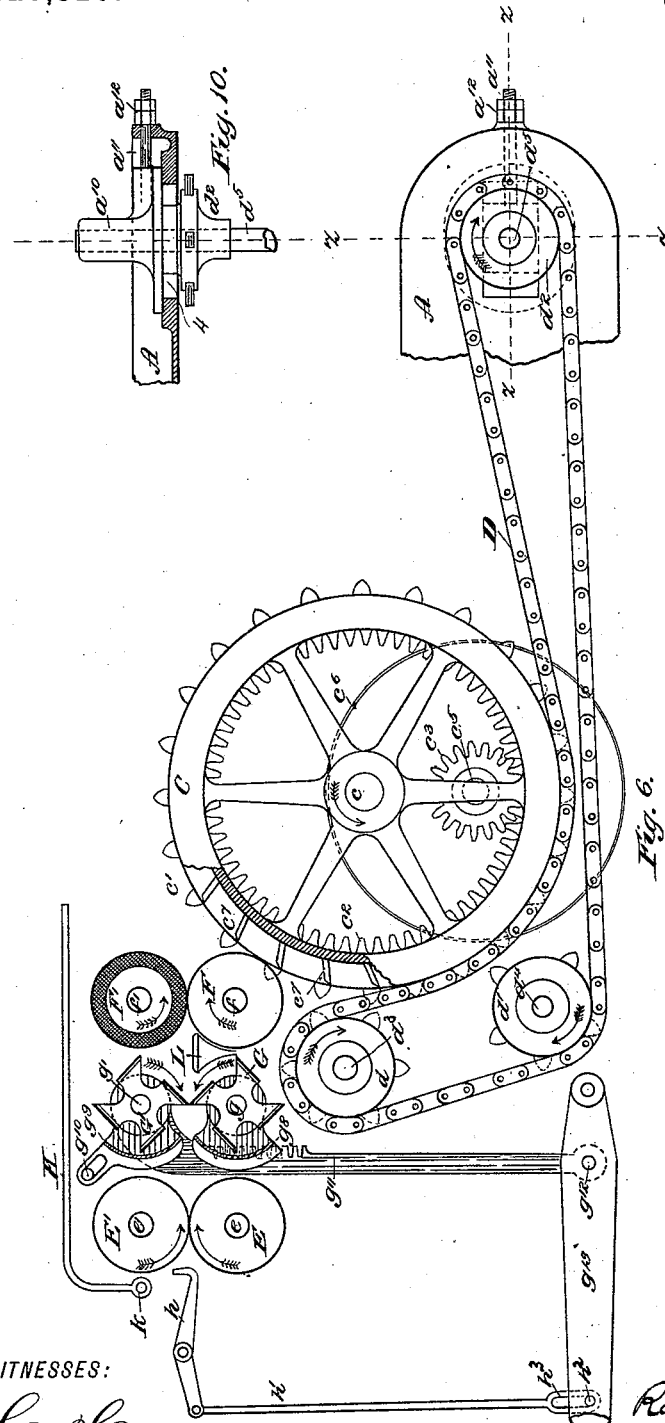
WITNESSES:
L. C. Hills
H. Sutherland
INVENTOR
Randolph G. Ward
BY E. B. Stocking
ATTORNEY (No Model.)  6 Sheets—Sheet 6.
R. G. WARD.
MACHINE FOR SCRAPING THE PULP, &c., FROM FIBROUS PLANTS.
No. 428,325. Patented May 20, 1890.
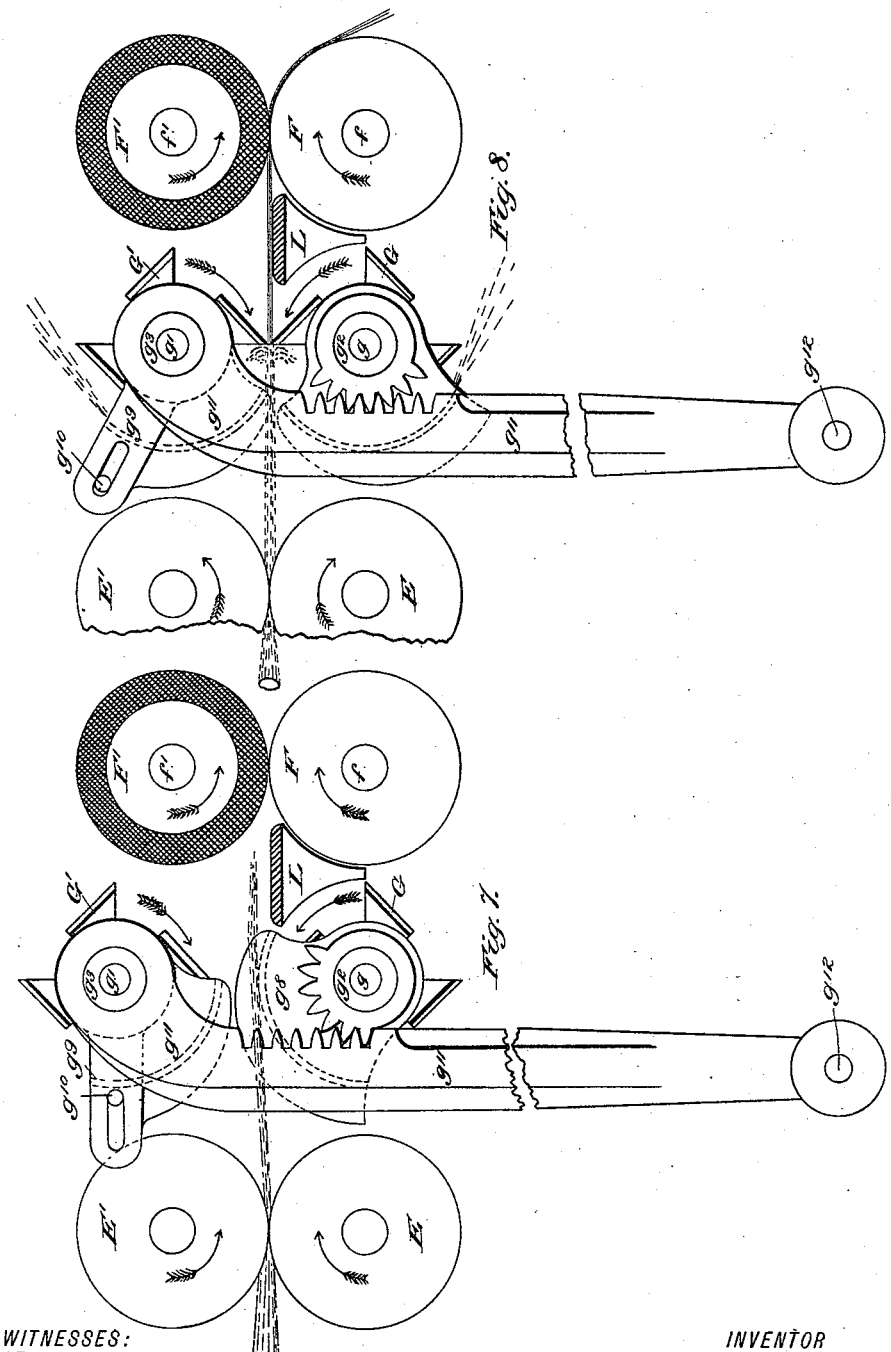

UNITED STATES PATENT OFFICE.

RANDOLPH G. WARD, OF BALTIMORE, MARYLAND.

MACHINE FOR SCRAPING THE PULP, &c., FROM FIBROUS PLANTS.

SPECIFICATION forming part of Letters Patent No. 428,325, dated May 20, 1890.

Application filed April 10, 1889. Serial No. 306,752. (No model.)

*To all whom it may concern:*

Be it known that I, RANDOLPH G. WARD, a citizen of the United States, residing at Baltimore, in the State of Maryland, have invented certain new and useful Improvements in Machines for Scraping the Pulp, &c., from Fibrous Plants, of which the following is a specification, reference being had therein to the accompanying drawings.

This invention has relation to a machine for cleaning, decorticating, or disintegrating such fibrous plants or leaves as the manila or abaca, hemp and the henequin, the Mexican agave, the maguey and pita, and similar fibrous substances having long sinuous fibers, and of which invention the following is a full and clear description, reference being had to the accompanying drawings, forming a part of the same.

Figure 1 is a broken side elevation of my machine and illustrating the driving mechanism prominently. Fig. 2 is a side elevation illustrating the reverse side of the machine and showing the gearing of the scraper-rolls prominently. Fig. 3 is a broken plan with the bonnet or cover removed, so as to show the interior of the machine as far as possible. Fig. 4 is a section of the machine on the line $x\,x$ of Figs. 1 and 2, parts being in elevation. Fig. 5 is a section of the machine on the line $y\,y$ of Figs. 1 and 2, parts being in elevation, omitting, however, portions of the machine beyond the line upon which the section is taken. Fig. 6 is a broken elevation corresponding to Fig. 1 of the interior mechanism of the machine. Fig. 7 represents, upon an enlarged scale, the two pairs of feeding-rolls, the scraping-rolls, their hoods, and actuating mechanism, and shows the scraping-rolls apart and covered by the hoods while the leaf passes to the second pair of feeding-rolls. Fig. 8 represents the same parts as Fig. 7, the scraping-rolls beng in action, having been brought together by the downward movement of the rack-bars, and shows the way in which the hoods are made to act. Fig. 9 is an enlarged view of the combination of bearings, springs, and rod at one end of the machine for causing the lifting of the upper scraping-roll constantly from the lower for the admission of leaves or plants. Fig. 10 represents a section on the line $z\,z$ of Fig. 6, partly in plan, of the devices upon each side of the rear end of the machine for taking up the slack of the scraping-chain. (See Figs. 1, 2, 3, and 6.)

Like letters of reference refer to the same parts in all the views.

A A are two parallel side frames of suitable design, preferably as shown, resting upon and suitably bolted to two sills B B, forming the base of the machine and joined by cross-pieces at proper intervals. The frames A A are also connected in several places by cross pipe and bar girders $a$.

$a'$ is a bracket provided with means for holding and adjusting the bearing for the horizontal shaft $i$, which will be hereinafter described. $a^2$ and $a^3$ are also brackets or knees having bearings for the said shaft and recesses for worms $i^5$, for transmitting power to the crushing and feeding rolls. These brackets have also upwardly-extending arms, with bearings 3 therein, in which are fitted the ends $e\,f$ of the lower feed-roll shafts $e'\,f'$, upon which are mounted the worm-wheels $e^2\,f^2$, through which power is transmitted, and each upper bearing being in the same piece as the bearing for the worm. The centers of the worms and worm-wheels are kept at a constant distance apart—a very important consideration in worm-gears.

$a^4\,a^5$, Fig. 2, are the lower and upper bracket-bearings of the shaft $g^9$, which transmits power to the scraping-rolls.

A' A' (see Figs. 1, 2, and 3) are right and left shoulder-pieces for holding the chute or feed-table, having lugs $h''$ upon their lower edges, in which the stop-gate $h$ pivots.

$a^7$ are two cap-pieces, one on each side of the frame, (see Figs. 1, 2, 3, and 5,) suitably bolted thereto and containing the screws $a^8$ over each bearing of the first and second upper feed-rolls, for adjusting the tension of springs $a^9$ above the same, as shown.

$a^{10}$ are two adjustable bearings in slots 4 in the frames A A, and provided with the draw-screws $a^{11}$ and the nuts $a^{12}$ for tightening the combing or scraping chain D. (See Figs. 2, 3, 6, and 10.)

C is a large pulley or drum (see Figs. 3, 4, and 6) suitably keyed upon the shaft $c$, and having upon its peripheral and outer edges the sprocket-flanges $c'$, and upon one inner edge the interior gear $c^2$, into which meshes the pinion $c^3$, attached to the shaft $c^5$, which is driven by the pulley $c^6$, (operated by any suitable power.)

$c^7$ is a series of scraping-blades of any desirable form and placed at convenient distances around the drum.

$c^8$ are suitable bearings, in which the shaft $c$ is journaled, which, by means of the bolts $c^9$, arranged in the frames A A (see Fig. 2) at right angles to the shaft $c$, make it possible to vary the position of the drum having the scrapers $c^7$ with relation to the lower metallic roll F of the second pair of feed-rolls. (See Figs. 2 and 6.)

$c^{10}$, Fig. 3, is the main bearing, in which is journaled the power-shaft $c^5$.

$c^{11}$ is a flat disk or plate suitably keyed or otherwise fastened to the outer projecting end of the shaft $c$.

D is a pair of endless chains arranged parallel to each other over the three sets of sprocket-wheels $d$, $d'$, and $d^2$, attached in pairs to the shafts $d^3$, $d^4$, and $d^5$, respectively, (see Figs. 1, 2, 3, 6, and 10,) connected one with the other by cross-girders $d^6$, Fig. 3, having therein scraping-blades which alternate in operation with the scrapers $c^7$ of the drum C.

E E' are the lower and upper rolls, respectively, of the first pair of feeding and crushing rolls, the same being (to facilitate decortication) corrugated. (See Figs. 3 and 5.) The lower roll E is fixed upon the shaft $e$, journaled at each end in fixed bearings in the frames A A, one end projecting beyond the frame and into the upwardly-extending arm of the bracket $a^3$, (see Figs. 1, 3, and 5,) and having attached thereto and between the bracket and the bearing in the frame the worm-wheel $e^2$ and the pinion $e^3$, Figs. 1, 3, and 5. The upper roll E' is attached to the shaft $e'$, journaled in bearings at each end of the roll and made so as to slide in vertical guides or slots in the frames A A opposite to each other, the roll E' being held down against the lower roll E by the pressure of the springs $a^9$, adjusted by the threaded plugs $a^8$ through the caps $a^7$, and a set-nut $a^{8\times}$ being employed to secure the plugs in an adjusted position. Upon the outer end of the shaft $e'$ is fixed the pinion $e^4$, corresponding to pinion $e^3$ on the shaft $e$ and driven by the same in the direction indicated, Figs. 6, 7, and 8.

F and F' are the lower and upper rolls, respectively, of the second pair of holding or feeding rolls, Figs. 6, 7, and 8. The lower roll is made of metal having a smooth periphery. The pressure of the scrapers is determined by the adjustment between the roll F and the scrapers on the drum C. The upper roll F' is a metal core having a coating of gum to increase the holding capacity, as well as to admit of leaves of unequal thickness passing simultaneously through the pair. The purpose of this pair of rolls is not, however, to crush, but while simultaneously feeding with the crushing-rolls and in the same direction they hold the leaf, preventing the drum and chain from snatching the first end through, and when the last end of the leaf has passed the stop-gate $h$ and the scraping-cylinders are brought to work, as will be seen in Figs. 6 and 8, in an opposite direction to the feed the said rolls also hold the leaf against action of the scrapers while feeding it to the wheel and chain and through the scrapers.

G G' are the lower and upper scraping rolls, respectively fixed upon the shafts $g$ and $g'$. The shaft $g$ is journaled in bearings $g^2$, situated fixedly in the side frames A A, with inner projecting noses 6, around which are fitted the flanged quarter-pinion heads of the lower hood $g^8$. The shaft $g'$ is journaled in bearings $g^3$, corresponding to those of the shaft $g$, except that they have a vertical reciprocating or sliding movement in guides 5, formed in the frames A A, and are kept constantly thrust upward by the combined pushing and drawing force of the springs $g^5$ and $g^4$, the former being guided by the rods $g^6$, attached at their lower ends to the said bearings $g^3$, and having the nuts $g^7$ at their upper ends. The form of these hoods is clearly seen in Figs. 6, 7, and 8, being substantially sector-shaped with flanged heads. Upon the inner projecting noses 7 of these bearings $g^3$ are fitted the flanged heads of the upper hood $g^9$, and also the heads of the downwardly-depending rack-bars $g^{11}$, which, being in gear with the pinioned heads of the flanged hood $g^8$, cause the hood partially to rotate when the upper cylinder is brought down upon the lower by the action of the foot upon the foot-board $g^{14}$ through the levers $g^{13}$ and the rod $g^{12}$. By the same downward motion the upper hood $g^9$ is made by means of the fixed pin or rod $g^{10}$ and the slot in its outer arm partially to rotate in the opposite direction, thus bringing the scraping-cylinders to act upon both sides of the approaching end of the leaf or plant, the curved hoods forming a guide for the pulp, (see Figs. 6, 7, and 8,) and the lower hood $g^8$ serving to guide the leaves over the lower scraping-roll G when the scrapers are separated. In Fig. 2 the rolls are shown in working position, the levers $g^{13}$ being depressed.

H is a chute or table, over which the leaves or plants are fed to the machine.

$h$ is a stop-gate, against the lip of which, Fig. 6, a course of leaves is placed while the previous course is passing through, so that the leaves or plants may enter together.

$h'$ are rods connecting the stop-gate with the foot-levers $g^{13}$, by which it is operated.

$h^2$ are bolts playing loosely in the elongated slots $h^3$ in the lower end of the rods $h'$, to allow for the difference of movement in the levers $g^{13}$ and the stop-gate $h$. (See Figs. 1, 2, and 6.)

I is a paper or leather friction wheel or pulley receiving motion from contact with the disk $c^{11}$.

$i$ is a shaft, to which the pulley I is attached by a threaded portion $i'$.

$i^2$ are lock-nuts on both sides of the pulley I, Figs. 1, 3, and 4. The shaft $i$ has a bearing $i^3$ in the bracket $a'$, said bearing being adjustable and held by the plug $i^4$, which plug passes through a boss $a^{4\times}$ on the bracket $a'$ and gages the impact between the disk and the pulley. This bearing is elongated, as shown clearly in Fig. 3, and works in an elongated slot in the bracket A', being guided by the walls of the opening, as will be clearly understood. The shaft of the worms $i^5 i^6$ has bearings in the brackets or knees $a^2 a^3$ and drives the crushing and holding rolls through the worm-gears $f^2$ and $e^2$, respectively.

J, Fig. 2, is a large master spiral gear fixed upon and driven by the shaft $d^3$, in turn driving as a spiral gear the pinion $j$ upon the shaft $g$ on the lower scraping-roll G. The pinion $j$ in turn drives as a quarter cut spiral the pinion $j'$, attached to and imparting motion to the shaft 9, having the wide-faced pinion $j^2$, which gears into (on a quarter spiral) and drives the pinion $j^3$, attached to the shaft $g'$ on the upper scraping-roll G'. The object of the extra long face upon the pinion $j^2$ is to admit of the vertical play of the pinion $j^3$ in the reciprocating movement of the cylinder G' while keeping its gear.

K is a hood or cover pivoted at $k$ upon a girder $a$. (See Fig. 6.)

L is a table suitably supported between the scraping and holding rolls, and serves the purpose of supporting the substance being operated upon.

The operation is as follows: A course of leaves the full width of the machine may be admitted over the feed-table to the crushing-rolls with the machine in its normal position, Figs. 1 and 7, and they are allowed to pass through far enough to become engaged between the holding-rolls F F' when the foot is placed upon the foot-board $g^{14}$, which connects the levers $g^{13}$, the shaft $g^{12}$ of which carries the lower ends of the rack-bars $g^{11}$ for actuating the hoods and scraping-rolls, as above described. The scraping-rolls clean the rear end of the leaf, while the drum and chain scrape the other. During this process the position of the parts of the machine is as shown in Figs. 2, 6, and 8. The fiber when cleaned passes out over the chain D. The operation is repeated as fast as the courses of leaves can follow one another.

I do not wish to be understood as limiting myself to the exact details of construction shown and described, as such may be varied by the exercise of mechanical skill.

What I claim is—

1. The combination, with the feeding-rolls, separable scraping-rolls, hoods adapted to serve as guides for the material acted upon, and feeding and holding rolls arranged in advance in the line of feed, of the scraping-rolls and provisions for separating the scraping-rolls and for operating the hoods, substantially as specified.

2. In combination with scraping-rolls, hoods adapted to serve as guides for the material acted on when the scraping-rolls are separated, and provisions for separating the rolls and operating the hoods, substantially as described.

3. The scraping-drum provided with an internal gear and with the external sprockets, in combination with a pinion for rotating the sprocket-drum and with a scraping-chain cooperating with the sprockets, substantially as described.

4. Feed-rolls, scraping-rolls rotating in a direction opposite to that of said feed-rolls, hoods, and means for separating the scraping-rolls and for changing the position of the hoods, holding and feeding rolls in advance of the scrapers, and scraping mechanism in advance of said holding and feeding rolls, substantially as specified.

5. A feed-table provided with a gate, in combination with the crushing and feeding rolls, separable scraping-rolls, and with movable hoods, and mechanism, substantially as described, for simultaneously operating the gate, the scraping-rolls, and the hoods, substantially as described.

6. A scraping-roller, its shaft and bearings, a hood having a quarter-gear and mounted on said bearings, and a second scraping-roller, its shaft and bearings, and a hood having a slotted arm and mounted on said bearings, in combination with a bar mounted on one of said bearings last mentioned, and having a rack engaging with said quarter-gear, and a pin projecting through said slot, substantially as described.

In testimony whereof I have affixed my signature in presence of two witnesses.

RANDOLPH G. WARD.

Witnesses:
E. B. STOCKING,
H. SUTHERLAND.